United States Patent Office 3,595,787
Patented July 27, 1971

3,595,787
STREAM POLLUTION CONTROL PROCESS
Morris Sheikh, 803 Canterbury Crescent,
Bloomfield Hills, Mich. 48013
No Drawing. Filed Apr. 14, 1966, Ser. No. 542,468
Int. Cl. C02c 5/02
U.S. Cl. 210—60
1 Claim

ABSTRACT OF THE DISCLOSURE

A stream pollution control process is disclosed comprising treating soluble oil waste emulsions in an industrial plant effluent with treatment chemicals selected from the group consisting of inorganic salts and bases to split said soluble oil waste emulsions into an oil phase containing said oil and a water phase containing said other pollutants, an emulsifier being added in said process to eliminate tendency of the oil phase to become sticky from said splitting by said treatment chemicals, separating said oil and water phases from each other and thereafter separately treating them without discharging oil or said other pollutants into streams, threating said oil phase to render it re-usuable as soluble oil, concentrating the water phase to render it re-usable as said treatment chemicals for treating further amounts of said soluble oil waste emulsions, and repeating the above treatment in a closed cycle in respect to said industrial plant effluent by re-using the concentrated water phase as said treatment chemicals to treat further amounts of soluble oil waste emulsions in said industrial plant effluent.

---

My invention is entitled stream pollution control process and relates to the art of treating industrial sewage containing significant quantities of oils and phenols.

Present day practice of treating such sewage is inadequate. The maintenance costs thereof are extremely burdensome. Sludge producing chemicals, which are lost in the treatment process, are added to the sewage to break down emulsions of oil in water or water in oil. The sludge formed is difficult and expensive to handle. The effluent stream from such treatment process carrying oils and phenols is dumped into our rivers and lakes causing the present deplorable condition thereof which is hereinafter referred to as stream pollution.

The principal object of my invention is to overcome the foregoing definciencies and to produce improvements, in the treament of such sewage, which eliminate oily and phenolic pollution of lakes, rivers and streams, and effect tremendous cost savings.

My invention treats such sewage with certain treatment chemicals capable of splitting the sewage into a water phase and an oil phase. The treatment chemicals are such that the water phase of my invention can be concentrated, replenished and reused over and over again and the oil phase can be reclaimed and chemically balanced to produce a water soluble oil concentrate adequate for reuse in the manufacturing operations from which the sewage was produced initially. Such treatment chemicals must be capable of producing the splitting operation without detrimental effects on reclaiming and reusing the resulting water phase and oil phase. Sludge which may be carried with such sewage may be removed prior to or after the splitting operation, and subsequently discarded. My sewage treatment method unlike present methods produces little or no sludge, requires no acid or acid salt neutralization, since such materials are not used, and eliminates the necessity for costly and inefficient lagooning procedures which constitute an indispensible requirement in the present art of sewage treatment. The sludge-free water phase is concentrated and replenished with fresh treatment chemicals for reuse. The water phase according to present methods is dumped into streams, lakes and waterways. The oil phase is reclaimed and chemically balanced, in accordance with my invention, with an emulsifier material, for reuse by the same industrial plant, from which the sewage emanated, thereby eliminating the share which this plant contributes to stream pollution with oils and phenols, and, at the same time, yielding substantial cost savings for the affected industrial plant. The oil phase according to present methods is discarded and hauled away as a scrap product at a cost to the particular industrial plant.

The treatment chemicals which I prefer to use: are highly alkaline; soluble in water; are not bacterially nutritional, i.e. they are of no nutritional value for bacteria, fungus and the like; are non-reactive with soluble oil emulsifiers; are substantially 100 percent non-corrosive in respect to ferrous metals; are substantially 100 percent non-precipitate-producing upon neutralization or hydrolysis; and are capable of splitting such sewage into a reuseable water phase and a reuseable oil phase. By highly alkaline is meant that solutions of such treatment chemicals yield a pH of about 8.7 to 14. By non-reactive with soluble oil emulsifiers is meant that less than 1 percent oxidation or reduction of these emulsifiers occurs upon treatment of such sewage with such treatment chemicals. The other characteristics, such as soluble in water, are self defining. Preferred species of such treatment chemicals are the sodium metal compounds selected from the group of hydroxides, carbonates, bicarbonates and tetraborates. Any mixture or derivative of these having like properties, of course, is included in this and similar definitions heren. Other compounds selected from the group of sodium and ammonium phosphates and ammonium hydroxides, carbonates, bicarbonates and tetrabonates are operative but these are bacterially nutritional.

The oils and phenols in such sewage find their way into industrial sewers from leakage around machinery which use water soluble cutting oils or non-emulsified hydraulic or lube oils, from deliberate dumping of contaminated oils and coolant emulsions, and in a multitude of other ways. The water soluble oils are basically mineral oils chemically modified and balanced by emulsifier systems to become dispersible in water. To prolong the service life of these oil in water or water in oil emulsions against bacterial degradation, germicides, such as phenols and numerous other toxic compounds, are added. Oils and phenols are the offenders mostly objected to from a stream pollution standpoint. The phenols are carried into industrial sewage with the soluble oils and eventually into lakes, rivers and streams with the effluent from present-day treatment of such sewage. Without any presently known exception significant quantities of oils and phenols will be present in such sewage, i.e. such as to prohibit dumping of such sewage into lakes, rivers and streams. For example, 2 parts per billion of phenols and any concentration of oils in such sewage or in any effluent will prohibit its dumping into such waters. The industrial sewage with which my invention is concerned is the spent or exhausted waste oils contaminated with foreign matter such as metal cuttings, dirt, silt and bacteria which emanate in high volume from industrial plants after use of such oils as lubricants, pressure transmittants, coolants and cleaners. The concentration of oils and phenols in such sewage will vary with each industrial plant between about ½ and 65 percent by volume oils and between about $\frac{1}{20}$ and 2 percent by weight phenols and/or other toxic germicidal materials.

I propose to treat industrial sewage emanating from an industrial plant by mixing therewith such treatment chemicals as described, preferably in concentrated aqueous solution form, made up from using about an equal weight of water to dissolve them. The treatment solution is preferably of this order of concentration due to the large volume of sewage to be treated. The treatment chemical concentration is selected so as to effect splitting of such sewage with minimum volumes. The amount of such solution required to be added is no more than that required to produce splitting of the sewage into the two phases mentioned. An excess is always used to insure 100 percent splitting. Whenever I refer herein to splitting of such sewage I always mean 100 percent splitting, even if not so specified as 100 percent. The excess does no harm and is reclaimed. The minimum amount required to be added depends upon the particular sewage to be treated, and is readily ascertained by testing samples of the sewage with varying quantities of the treatment solution to determine the least amount of the latter required to effect 100 percent splitting of the sample. 100 percent splitting is determined from observation of the clarity of both the water and oil phases. Neither is clear if there is less than 100 percent splitting. In practice the amount of treatment chemicals added to the industrial sewage of any given industrial plant is determined from the minimum amount of such treatment chemicals required to effect 100 percent splitting of the new unused water soluble oil concentrate used by this particular plant. Such minimum amount will always exceed that required to effect 100 percent splitting of the industrial sewage emanating from the affected plant. An excess over such minimum amount is preferred to assure consistent sewage splitting, and about 10 percent excess is usually used. The mixing may be accomplished in large tanks, designed to handle the volume of plant effluent, and the thusly treated sewage may be pumped to other similar large tanks for separation into the two phases by gravity settling. The same settling separates whatever sludge is in the sewage from the water phase, the oil phase having risen to the top of the water phase. Other methods such as well known mechanical methods may be used to separate the two phases. Likewise the sludge may be separated from the water phase by other methods or may be separated from the sewage prior to my treatment. In my treatment, liquids only are handled. Some sludge may accumulate in the mixing tank from reaction of caustic with iron dissolved in such sewage, but this settles by gravity or it can be separated by filtration or centrifuging. In present day practices sludge is formed upon the neutralization of acids or acid salts, such as the chlorides or sulphates of iron, which are added to the sewage, and large volumes of sludge must be handled. In my treatment the sludge-free water phase is pumped to the make-up tank where the solution of treatment chemicals is replenished after first concentrating it (as by evaporation) or it may be concentrated in the make-up tank. After being concentrated it is used to dissolve fresh treatment chemicals. It may be concentrated to any desired volume as best suits the particular treatment equipment. The oil phase which is also sludge-free is pumped to an oil reclamation tank and there treated with an emulsifier material to render it dispersible in water and reusable as soluble oil concentrate in the industrial plant producing the sewage. In some cases it is preferable to render water dispersible the separated oil phase prior to pumping it to the oil reclamation tank. For example, there may be present soluble oils which tend to become sticky after being split by treatment chemicals, particularly caustic. This sticky tendency is obviated by treatment with the emulsifier material. The emulsifier material with which the sludge-free separated oil phase is treated to render it dispersible in water may be readily prepared by one skilled in the art of converting oils, such as mineral oil, from a hydrophobic (non-dispersible in water) to a hydrophilic (water dispersible) material. Such emulsifier material may, for example, comprise an emulsifier system consisting of stoichiometric amounts of surfactants, fatty acids, coupling agents, soaps, and like substances which, when added to mineral oil, serve to convert such oil from a hydrophobic to a hydrophilic material. The following is an example of a satisfactory emulsifier system for treating the sludge-free separated oil phase of my invention to render it dispersible in water and reusable as a clear 100 percent water soluble oil concentrate.

| | Percent by weight |
|---|---|
| Reclaimed oil (sludge-free separated oil phase of Example I) | 73.20 |
| Aerosol OT (American Cyanamid) | 0.55 |
| Stephanate X (Stephen Chemical Company) | 1.10 |
| Dowfax 9N9 (Dow Chemical Company) | 0.44 |
| Dowanol PM (Dow Chemical Company) | 0.10 |
| High molecular weight petroleum sulfonate (Shell Oil Company) | 6.60 |
| Oleic acid (Eaton Chemical Company) | 8.75 |
| Triton Gr 7 (Rohm and Haas) | 5.14 |
| Water (room temperature) | 3.25 |
| $NaNO_2$ (Eaton Chemical) | 0.87 |
| Total | 100.00 |

The oil phase which may carry some water and treatment chemicals does not have to be concentrated prior to adding the emulsifier material since the latter can tolerate as much as 50 percent water and 10 percent treatment chemicals.

Nothing need be dumped into lakes, rivers and streams in my sewage treatment method. My invention eliminates: the high maintenance costs of present day industrial sewage treatment particularly by not producing sludge and dealing with liquids only and by permitting the use of unlined iron vessels; the costly need to neutralize and dispose of the treatment chemicals; the handling of corrosive materials, such as acids or acid salts, and the inevitable corrosion of the treatment equipment; and most importantly, pollution of lakes, rivers and streams with oils and phenols.

The following are examples of my invention.

EXAMPLE I 10 liters of industrial sewage containing oils and phenols (5 percent water soluble and 3 percent non-emulsified oils by volume and 0.2 percent by weight of orthophenylphenols) were obtained from an automotive manufacturing plant and passed through a filter (number 38 filter paper) to remove sludge, and transferred to a mixing tank. 200 milliliters of 50 percent by weight caustic solution (NaOH) were prepared in a caustic solution tank and transferred to the mixing tank containing the sewage therein. The mixture was agitated with an impeller type agitator and allowed to settle into an upper oil phase and a lower water phase which were separated. The water phase amounted to about 9.4 liters and was returned to the caustic make-up tank. The water phase was analyzed and found to contain 98.2 grams of caustic, 20 grams of the phenol compound mentioned, and unmeasured soluble residuals such as surface active agents and the like which were extracted from the emulsified oil. The water phase was concentrated and fresh caustic was added as make-up. 400 grams of fresh caustic were needed to bring the strength of the treatment solution to 50 percent caustic by weight. After the addition of make-up caustic the volume of the concentrated and strengthened water phase was about 1 liter. The oil phase amounted to 0.8 liter (710 grams) and was transferred to a reclamation tank. 180 grams of an emulsifier material marketed as N15 by the Standard Oil Co. of Ohio were added to the oil phase in the reclamation tank, and the mixture was agitated with an impeller type agitator and allowed to settle. The result was a clear 100 percent water soluble oil concentrate of about 1 liter in volume. The concentrate was successfully subjected to evaluation tests as shown hereinafter. The process was repeated by treating 50 liters of additional sewage with the 1 liter treatment solution made up from the concentrated and strengthened water phase as above described. The water phase obtained from splitting the 50 liters of additional sewage was concentrated to 1 liter to be accommodated in the caustic solution tank, the capacity of which was of this order.

EXAMPLES II–IV

The above example was repeated except that, in lieu of 10 liters, 1 liter samples (3 in all) of such sewage were treated and the caustic treatment solution was substituted, respectively, by 15 grams of solid sodium carbonate, 15 grams of solid sodium bicarbonate and 40 grams of solid borax with comparable results. In each of these examples about 920 milliliters of water phase were recovered which was concentrated to 250 milliters and used to treat 1 liter of additional sewage. In each of these examples 94 milliliters of oil phase were recovered and treated with 20 grams of N15 emulsifier material mentioned above with the result in each case that 100 milliters of clear 100 percent water soluble oil concentrate were obtained.

EXAMPLES V–XIV

Industrial sewage samples (10 in all) from other metalworking plants was treated as in Example I except that the cuastic treatment solution was substituted, respectively, by quantities of solid mono-, di-, and tri-sodium phosphate, solid monobasic, dibasic and meta ammonium phosphate, liquid 15 normal ammonium hydroxide, solid ammonium carbonate, solid ammonium bicarbonate, and solid ammonium borate, with comparable results considering, however, that these treatment chemicals added to the sewage ranged between 0.2 percent and 5 percent by weight of the untreated sewage and in each case 100 percent splitting of the sewage was accomplished. For all practical purposes the volume measure (in metric units) of the untreated sewage was considered its weight.

EXAMPLE XV

| | Weight (grams) |
|---|---|
| Reclaimed oil (sludge-free separated oil phase of Example I) | 887.00 |
| Aerosol OT (American Cyanamid) | 6.70 |
| Stephanate X (Stephen Chemical Company) | 13.30 |
| Dowfax 9N9 (Dow Chemical Company | 5.30 |
| Dowanol PM (Dow Chemical Company) | 1.20 |
| High molecular weight petroleum sulfonate (Shell Oil Company) | 80.00 |
| Oleic acid (Eaton Chemical Company) | 106.50 |
| Triton GR 7 (Rohm and Hass) | 63.40 |
| Water (room temperature) | 40.00 |
| $NaNO_2$ (Eaton Chemical) | 10.50 |
| Total | 1212.90 |

The 1212.90 grams was the weight of about 1.3 liters of a clear 100 percent water soluble oil concentrate (specific gravity of 0.941 at 60 F.) which was successfully subjected to evaluation tests as follows.

Evaluation tests

The following are results of evaluation tests performed on 5 percent emulsions made from the water soluble oil concentrate of Examples I and XI.

| Example | pH | Surface tension, dynes/cm. | Corrosion test |
|---|---|---|---|
| I | 8.8 | 34 | No rust. |
| XI | 9.4 | 30 | Do. |

The corrosion tests were conducted according to the plant requirements by soaking (100 percent Relative Humidity) cast iron chips in each of the 5 percent emulsions for 24 hours at 70° F. The surface tension test was conducted according to method ASTM-D1331.

It will thus be seen that there has been provided by the present invention Improvements in the Treatment of Industrial Sewage in which the object hereinabove set forth together with many thoroughly practical advantages has been successfully achieved. Various changes and modifications may be made without departing from the spirit of my invention as defined in the appended claim.

What is claimed is:

1. A stream pollution control process for treating soluble oil waste emulsions which emanate from industrial plants to prevent pollution of streams with oil and other pollutants contained in such soluble oil waste emulsions, said process comprising treating said soluble oil waste emulsions in an industrial plant effluent with non-sludge-producing treatment chemicals selected from the group consisting of inorganic salts and bases to split said soluble oil waste emulsions into an oil phase containing said oil and a water phase containing said other pollutants, an emulsifier being added in said process to eliminated tendency of the oil phase to become sticky from said splitting by said treatment chemicals, separating said oil and water phases from each other and thereafter separately treating them without discharging oil or said other pollutants into streams, treating said oil phase to render it re-usable as soluble oil, concentrating the water phase to render it re-usable as said treatment chemicals for treating further amounts of said soluble oil waste emulsions, and repeating the above treatment in a closed cycle in respect to said industrial plant effluent by re-using the concentrated water phase as said treatment chemicals to treat further amounts of said soluble oil waste emulsions in said industrial plant effluent.

References Cited

UNITED STATES PATENTS

| 1,860,248 | 5/1932 | Hyman et al. | 252—330 |
| 2,167,327 | 7/1939 | Talley et al. | 252—330 |
| 2,740,804 | 4/1956 | Glazier | 210—42X |
| 3,350,301 | 10/1967 | Hoffman | 252—330X |
| 3,414,523 | 12/1968 | Jockel | 210—61X |

OTHER REFERENCES

Haseltine, T. R.: Character and Treatment of Soluble Oil Wastes, Sewage Works Journal, vol. 21, September 1949, pp. 859–869 and 873–876 relied on.

MICHAEL ROGERS, Primary Examiner

U.S. Cl. X.R.

252—324, 330